Patented Mar. 25, 1930

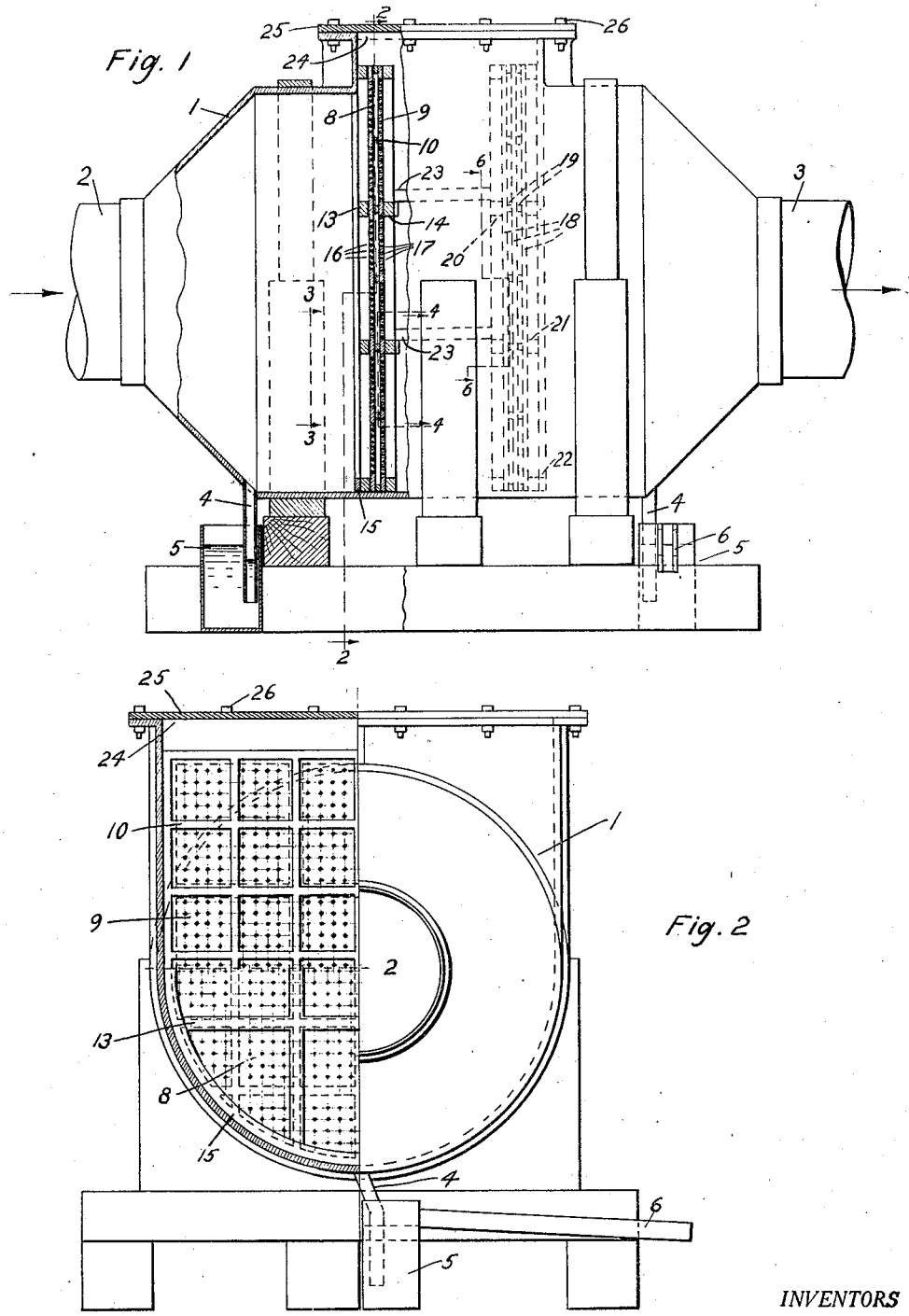

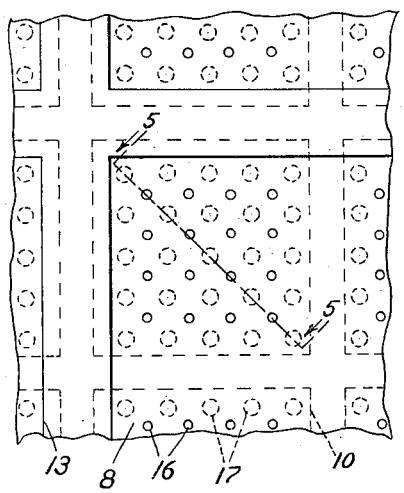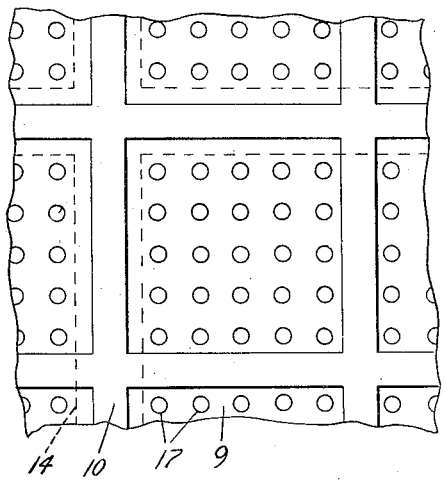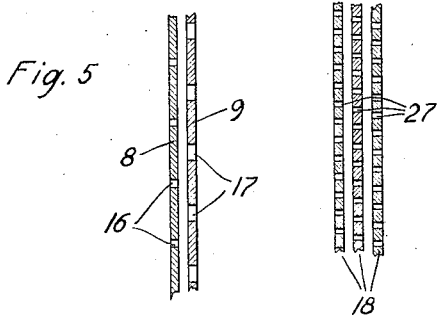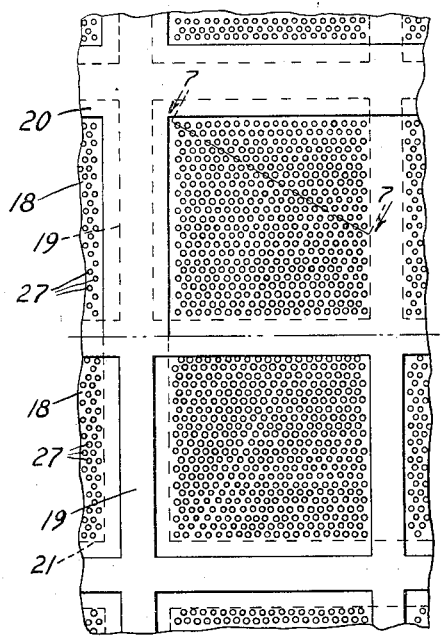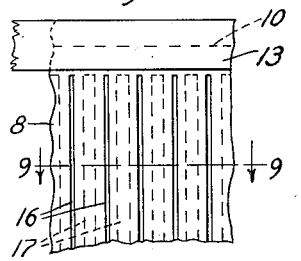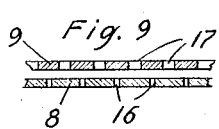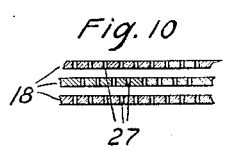

1,752,260

UNITED STATES PATENT OFFICE

WILLIAM ALEXANDER SKEEN CALDER, OF RAVENSTHORPE, HARBORNE, AND WILLIAM HAROLD PALMER, OF SMETHWICK, BIRMINGHAM, ENGLAND

GAS SCRUBBER

Application filed July 14, 1924. Serial No. 726,033.

This invention relates to gas scrubbers of the type in which the gas to be treated is passed through perforated plates for the purpose of separating suspended liquid particles therefrom and the main object of the invention is to provide a gas scrubber of this character which will be simple and economical in construction and of high efficiency of operation.

The accompanying drawings illustrate an embodiment of my invention and referring thereto:

Fig. 1 is a side elevation of the scrubber partly in section.

Fig. 2 is an end elevation thereof partly in section on the line 2—2 in Fig. 1.

Fig. 3 is a face view of part of one of the perforated plates used in the device, said view being taken on the line 3—3 in Fig. 1.

Fig. 4 is a similar view taken on the line 4—4 in Fig. 1.

Fig. 5 is a section on line 5—5 in Fig. 3.

Fig. 6 is a face view of part of the supplementary or baffle devices taken on line 6—6 in Fig. 1.

Fig. 7 is a section on line 7—7 in Fig. 6.

Fig. 8 is a partial front view of a modified form of the scrubber plates.

Fig. 9 is a horizontal section on line 9—9 in Fig. 8.

Fig. 10 is a similar view of a corresponding modification of the supplementary scrubbing plates.

Referring to Figs. 1 and 2 our invention may comprise a shell or casing 1 having an inlet 2 at one end and an outlet 3 at the other end for passage of gas through said casing preferably in a horizontal direction. Said casing may as shown be rounded at its bottom and provided with any desired number of drainage pipes for example a drain pipe 4 at each end thereof extending into a trap or liquid sealed device 5 from which leads a launder 6 for delivering the liquid material removed from the gas in the scrubbing operation.

Mounted within the casing 1 are perforated scrubber plates indicated at 8 and 9, said plates extending vertically and transversely of the chamber 1 so as to extend completely across said chamber and from top to bottom thereof, and being otherwise arranged so as to completely intercept all of the gas passing through said chamber whereby all of said gas is caused to traverse said perforated plates. Any desired number of such plates may be provided but we have obtained satisfactory results with a single pair of plates perforated in a special manner as hereinafter set forth, so as to produce the maximum separating or scrubbing action. Said plates 8 and 9 are spaced apart by spacers indicated at 10 formed as a grid and the ribs or bars of which are spaced far enough apart to permit substantially free access of the gas to the perforated plates 8 and 9 while holding said plates in spaced relation. The plates 8 and 9 may be held against said spacing means by open frames 13 and 14 which are held against said plates by means hereinafter set forth, the frame 13 bearing against a shoulder portion 15 on the casing 1. The said frames 13 and 14 are also formed as grids or reticulate frames the cross bars of which are or may be spaced so as to retain the perforated plates 8 and 9 between the respective members 10, 13, and 14 while permitting passage of gas through said perforated plates. The perforations or openings 16 and 17 in the respective plates 8 and 9 are preferably round as shown in Figs. 3 and 4 and are so formed as to provide for maximum pressure drop and maximum velocity in the perforations of the first plate and relatively small pressure drop in the perforations of the second plate. Furthermore in order to produce maximum efficiency the perforations are preferably uniformly spaced on both plates so that there are the same number of perforations in each plate but the perforations in the second plate are larger than those in the first plate. Furthermore the perforations in the second plate are individually staggered or in alternate relation with respect to those in the first plate so that the gas passing through any perforation 16 in the first plate will encounter a blank or unperforated space on the second plate, which is equidistant from the adjacent perforations 17 in said second plate, thus providing for uniform conditions throughout the area of the plates and resulting maximum efficiency. As shown in Fig. 3, not only are the several rows of perforations in each plate staggered with respect to rows in the other plate, but also the individual perforations in each row are staggered with respect to the perforations in adjacent rows in the other plate. As an example of our invention we have used with high efficiency a construction in which the first plate 8 is provided with $\frac{1}{16}$ inch perforations $\frac{1}{2}$ inch apart, and the second plate 9 is provided with $\frac{1}{8}$ inch perforations $\frac{1}{2}$ inch apart, the plates being spaced say from $\frac{1}{16}$ to $\frac{1}{8}$ inch apart.

We also prefer to use in addition to the primary scrubber plates above described a set of supplementary separator or baffle plates indicated at 18 which are mounted in the casing 1 so as to extend across the flue or chamber formed by said casing and to intercept the gas stream after it passes the primary scrubber plate. There may be any desired number of these supplementary separator plates, preferably three or more. These supplementary plates may be provided with perforations 27 arranged so as to exert a baffling effect on the gas but presenting a total area in excess of the total area of the perforations in the primary scrubber plate 8. For example the plates 18 of this supplementary set may be provided with $\frac{1}{16}$ inch openings spaced $\frac{1}{8}$ inch apart. These supplementary plates may be spaced apart by spacing grids 19 and retained by grid frames 20 and 21 similar to the members 10, 13 and 14 above described so as to hold said plates 18 in position while permitting passage of gas therethrough. The spacing and arrangement of the perforations 27 in successive plates 18 is preferably such that the holes in each plate are alternate or staggered with respect to those in the following plate, so as to provide numerous changes in direction of gas flow and contact with solid surfaces. The grid frame 21 may rest against the shoulder 22 of the casing 1 and the two sets of scrubbing devices may be retained in position by struts or wedges 23 interposed between the inside grid frames 14 and 20 driven in position so as to engage tightly the said members and hold the parts rigidly in position.

Casing 1 is preferably provided with an opening 24 at its top normally closed by a cover plate 25 secured tightly in position by bolts 26, said opening 24 being of sufficient size to enable insertion and withdrawal of the respective perforated plates 8, 9, and 18 and spacing and supporting grids and grid frames 10, 13, 14, 19, 20, and 21 through said opening.

The apparatus above described is particularly intended and adapted for the scrubbing or treatment of gas or vapors containing liquid particles or mist, for example, acid mist resulting from the evaporation or concentration of sulphuric acid or other acid. It will be understood that in case the apparatus is applied to such treatment of acid mist the various parts thereof will be made acid resistant for example the plates 8 and 9 may be made of lead or of other acid resistant metal and the casing 1 may be of such metal or lined therewith. The plate retaining members 10, 13, 14, 20, and 21 and 23 may also be formed of acid resistant metal, for example, regulus metal or wood covered with lead.

The operation is as follows:

The gas to be treated or scrubbed is passed from the inlet 2 through the chamber 1, being supplied under sufficient pressure to cause it to pass through the perforations 16 in plate 8 at a high velocity and to impinge upon the parts of the plate 9 opposite the perforations in plate 8 and to then pass through the openings 17 in plate 9. With the construction described in which the plate 8 is provided with $\frac{1}{16}$ inch holes spaced $\frac{1}{2}$ inch apart and the plate 9 is provided with $\frac{1}{8}$ inch holes $\frac{1}{2}$ inch apart and the plates 8 and 9 being from $\frac{1}{16}$ to $\frac{1}{8}$ inch apart, the larger portion ($\frac{3}{4}$ or more) of the total pressure drop in the apparatus will take place in passing through the first plate and in the constriction between the first and second plates, the total area of the perforations in the second plate being sufficiently great to admit of substantially free release of gas. By this means we ensure the production of maximum velocity in passing through the perforations of the first plate 8 with resulting high efficiency in the scrubbing action. Moreover as each perforation 16 in the first plate 8 is disposed between perforations in the second plate 9 the gas passing through any perforation in the first plate is free to find exit on deflection in either direction by the second plate and does not interfere with the free release or exit of the gases issuing from any other perforation in the first plate.

The effect of the said plates 8 and 9 is to cause substantial agglomeration of particles of liquid carried by the gas so that they may be separated from the gas by any suitable obstructing surfaces for example by the set of plates 18 above described, these plates offering a total area of perforations of relatively large capacity compared with the first set of plates so as not to produce any considerable pressure drop or to greatly impede the release of the gas from the apparatus but to present sufficient area and baffling effect to collect and separate the agglomerated liquid particles from the gas stream, the liquid particles so separated from the gas stream descending by gravity to the bottom of the casing and flowing out through the drainage means 4, 5, and 6 aforesaid.

The perforations in the plates of the scrubber are preferably made round and may be arranged in rows extending horizontally and vertically or diagonally as may be desirable in any particular case. However, as shown in Figs. 8 and 9 the perforations 16 and 17 in the respective plates 8 and 9 may be formed as vertical slits or slots, the slits 16 in the plates 8 being relatively narrow, say $\frac{1}{32}$ inch across, whereas the slits in the second plate 9 are relatively broad, say $\frac{1}{8}$ inch across so that the pressure drop is mainly through the perforations in the first plate and is inconsiderable in the second plate thereby ensuring high velocity of the gas passing through the orifices in the first plate and impinging on the second plate and resulting in high efficiency of the scrubbing operation. As indicated in Fig. 10 the supplementary scrubber or separating plates 18 may be provided with similar vertical slits or slots 27. In case the apparatus is to be used in treatment of acid bearing gases the scrubber plates shown in Figs. 8 to 10 may advantageously be made of glass or other rigid acid resistant material.

It will be understood that other modifications in the arrangement and shape of the perforations in the plates and in the arrangement and construction in the various parts of the apparatus above described may be made without departing from our invention. It is important in any case however, for the highest efficiency that the openings in the two primary scrubber plates correspond to one another and are arranged alternately as above described, so that the imperforate portion of the second or impact plate which is opposite any opening in the first plate is symmetrically disposed with respect to the adjacent openings in the second plate. It should of course be understood that slight variations from perfect symmetry of arrangement may be made without materially decreasing the efficiency of the scrubber, and that such slight variations, resulting from failure to exactly align the plates or otherwise, do not depart from the spirit of the invention.

In order to provide for efficient operation of the scrubber in any of the forms above described it is necessary to supply the gas to be scrubbed at sufficiently high pressure to produce the requisite high velocity in passing through the perforations of the first plate, that is to say the plate which is provided with smaller perforations. For example the pressure of the gas supplied to the scrubber may be such as to correspond to from four inches to 8 inches of water and the resulting velocity of the gas in passing through the perforations of the first plate may be from 40 to 150 feet or more per second. The pressure referred to represents the pressure drop between the inlet and the outlet of the scrubber and such pressure drop may be produced by a pressure fan connected to the inlet of the scrubber, or a suction fan connected to its outlet.

While any desired number of scrubber sets may be used we have found that the greatest efficiency is obtained by utilizing substantially the whole of the pressure drop in one stage, that is with one set of scrubber plates, the supplementary plates, if any, being used only as eliminators. Furthermore it is essential that the gas should be freely released or permitted free escape after impact on the impact plate and therefore the openings on the second or impact plate of the scrubber set should be relatively large as compared with the openings in the first or velocity producing plates, the openings in the first plate being for example, from $\frac{1}{32}$ to $\frac{3}{32}$ inches in diameter, and the openings in the second plate having from three to five times the area of the openings in the first plate. It is also desirable that the distance between the velocity producing plate and the impact plate should be as small as possible without interfering with or chocking the passage of the gases in leaving the impact plate, and for this purpose it is desirable that the distance between the plates shall not be less than one quarter the diameter of the perforations in the first plate, such distance being for example $\frac{1}{32}$ to $\frac{3}{32}$ inch. The plates may be of any desired thickness, but preferably they are made as thin as may be consistent with the requisite mechanical strength, say $\frac{1}{16}$ inch to $\frac{1}{8}$ inch thick.

In case the apparatus is used for scrubbing acid fumes it is desirable to provide for humidification of the gases so as to obtain maximum scrubbing action as set forth in our Patent No. 1,490,588, issued April 15, 1924.

What we claim is:

A gas scrubber comprising a casing provided with inlet and outlet means at opposite ends thereof and having shoulders adjacent the respective inlet and outlet means and an opening at its top, grid frames insertable through said opening and engaging the shoulders, perforated scrubber plates insertable through said opening, grid spacers insertable through said opening, said perforated scrubber plates and grid spacers being alternately arranged to form two sets of spaced scrubber plates engaging the respective grid frames, another pair of grid frames insertable through said opening and engaging the other sides of said sets of scrubber plates, and removable wedge means engaging said last named grid means to retain said frames and the sets of scrubber plates in position within said casing.

In testimony whereof we have hereunto subscribed our names this 18th day of June, 1924.

WILLIAM ALEXANDER SKEEN CALDER.
WILLIAM HAROLD PALMER.